(12) United States Patent
Zhang et al.

(10) Patent No.: US 9,021,939 B2
(45) Date of Patent: May 5, 2015

(54) TEA MAKER

(75) Inventors: Bei Zhang, Shenzhen (CN); Huajin Chen, Shenzhen (CN)

(73) Assignee: Crastal Technology (Shenzhen) Co., Ltd., Shenzhen, Guangdong (CN)

( * ) Notice: Subject to any disclaimer, the term of this patent is extended or adjusted under 35 U.S.C. 154(b) by 268 days.

(21) Appl. No.: 13/697,004

(22) PCT Filed: May 24, 2011

(86) PCT No.: PCT/CN2011/074573
§ 371 (c)(1),
(2), (4) Date: Nov. 8, 2012

(87) PCT Pub. No.: WO2012/034411
PCT Pub. Date: Mar. 22, 2012

(65) Prior Publication Data
US 2013/0055901 A1  Mar. 7, 2013

(30) Foreign Application Priority Data

Sep. 17, 2010  (CN) .......................... 2010 1 0285463

(51) Int. Cl.
*A47J 31/00* (2006.01)
*A47J 31/20* (2006.01)
(52) U.S. Cl.
CPC ...................................... *A47J 31/20* (2013.01)

(58) Field of Classification Search
CPC .................................. A47J 31/20; A47G 19/16
USPC ............................................ 99/318, 319, 320
See application file for complete search history.

(56) References Cited

U.S. PATENT DOCUMENTS

| 2,368,496 | A | * | 1/1945 | Sharp | 99/336 |
|---|---|---|---|---|---|
| 3,724,359 | A | * | 4/1973 | Masters et al. | 99/281 |
| 6,135,010 | A | * | 10/2000 | Husted et al. | 99/319 |
| 6,915,733 | B1 | * | 7/2005 | Langbauer | 99/319 |
| 8,584,576 | B2 | * | 11/2013 | Fogg, IV | 99/288 |
| 2010/0018403 | A1 | * | 1/2010 | Hoare et al. | 99/281 |

* cited by examiner

*Primary Examiner* — Reginald L Alexander
(74) *Attorney, Agent, or Firm* — Raymond Y. Chan; David and Raymond Patent Firm

(57) ABSTRACT

A tea maker provides a simple structural configuration, stable and rigid structure, and low manufacturing cost, and is adapted to effectively separate the tea leaves from the brewed tea for adjustably controlling the concentration of the brewed tea. The tea maker includes a supporting frame, a tea infusing container with a container lid, a tea basket disposed in the tea infusing container, and a control circuit. A sliding arrangement includes a vertical support, a sliding frame slidably coupled at the vertical support, and a resilient element. The sliding frame includes a hanger, an actuator, and a first permanent magnet. The hanger is supported above and aligned with an electromagnet. A second permanent magnet is provided at the outer side of the surrounding wall of the tea basket and is magnetically attracted with the first permanent magnet.

6 Claims, 4 Drawing Sheets

TEA MAKER

BACKGROUND OF THE PRESENT INVENTION

1. Field of Invention

The present invention relates to a tea maker.

2. Description of Related Arts

There are various tea infusers in the market. For example, China Patent No. ZL200410041385.2, filed Jul. 12, 2004, disclosed an automatic tea apparatus which comprises a tea pot body, a supporting plate supported on the tea pot body, a tea cup detachably supported on the supporting plate, and a filtering mesh provided at the tea cup, wherein a thermo cup is provided below the supporting plate at a position that a water flow passage is communicating between the tea cup and the thermo cup. A water valve is provided at the water flow passage. The automatic tea apparatus is arranged to extract the tea and to separate the tea leaves by the filtering mesh (similar to the tea basket of the present invention) in order to filter the tea leaves from the extracted tea.

According to another prior art, the conventional tea apparatus provides a tea basket detachably coupled to the tea cup in order to separate the tea leaves from the extracted tea. For example, another China Patent No. CN200780045857.3, filed Oct. 24, 2007, disclosed a tea infuser which comprises a container a vertical conveyor communicatively linked to the container, and a basket which is disposed in the container and is operatively linked to the vertical conveyor. However, such tea infuser has several drawbacks including: (1) the structure is complicated that the manufacturing time of the tea infuser will be substantially increased, (2) the vertical movement of the basket is controlled by a rotational movement of a screw to lift up or drop down the basket, such that the basket will not stable, and (3) the production cost of the tea basket is relatively high.

SUMMARY OF THE PRESENT INVENTION

According to the deficiencies in the prior arts, the invention is advantageous in that it provides a tea infuser which provides a simplified structural configuration, high stability of the basket, low manufacturing cost, and can effectively separate the tea leaves from the brewed tea to adjustably control the concentration of the brewed tea.

Additional advantages and features of the invention will become apparent from the description which follows, and may be realized by means of the instrumentalities and combinations particular point out in the appended claims.

According to the present invention, the foregoing and other objects and advantages are attained by a tea maker which comprises a supporting frame which is embodied as a vertical supporting post, a tea infusing container with a container lid supported by the supporting frame, a tea basket with a basket lid disposed in the tea infusing container, and a control circuit. The supporting frame comprises at least a vertical support. The tea maker further comprises a sliding arrangement which comprises a sliding frame slidably coupled at the vertical support, and a resilient element, wherein the resilient element, which is preferably a compression spring, is supported below the sliding frame. Therefore, resilient element is retained at a working mode that the resilient element is compressed by the sliding frame. Or, when the resilient element is supported above the sliding frame, the resilient element is retained at the working mode that the resilient element is stretched out by the sliding frame. The sliding frame comprises a hanger protruded therefrom, an actuator, and a first permanent magnet. The hanger is aligned with and positioned corresponding to an electromagnet which is located at the bottom of the vertical support, wherein the hanger is supported above and aligned with the electromagnet. The tea basket further comprises a second permanent magnet provided at the outer side of the surrounding wall of the tea basket and is magnetically attracted with the first permanent magnet.

Accordingly, the hanger can be replaced by an armature and the electromagnet can be replaced by induction coil assembly in order to adjustably control the concentration of the brewed tea.

According to the present invention, the sliding arrangement further comprises a second guiding groove vertically formed at the inner side of the surrounding wall of the tea infusing container, wherein the second permanent magnet is slidably engaged with the second guiding groove, so as to ensure the tea basket being stably slid up and down.

According to the present invention, the sliding arrangement further comprises a first guiding groove vertically formed at the outer side of the surrounding wall of the tea infusing container, wherein the first permanent magnet is slidably engaged at the first guiding groove, so as to ensure the sliding frame being stably slid up and down.

According to the present invention, the tea infusing container can configured to have a circular shape or rectangular shape. Or, the tea infusing container can configured to have a flat sidewall integrated with a curved sidewall to form an irregular surrounding wall of the tea infusing container. Or, the tea infusing container can configured to have a flat sidewall integrated with an irregular sidewall to form the irregular surrounding wall of the tea infusing container.

According to the present invention, the heater unit is provided at the bottom side of the tea infusing container, wherein the heater unit can be a heating plate or heating tube.

According to the present invention, tea maker further comprises a water tank supported above the tea infusing container, wherein an electromagnetic water valve is provided at the water outlet of the water tank to communicatively align with a first water inlet of the tea infusing container. Accordingly, the electromagnetic water valve is controlled by the control circuit to selectively open and close the electromagnetic water valve to fill the water into the tea infusing container. The supporting frame further comprises a supporting shaft. The water tank is rotatably coupled at the supporting shaft, wherein the water tank and the tea infusing container can be rotatably moved at the supporting shaft.

In accordance with another aspect of the invention, the present invention comprises a tea maker which comprises a tea infusing container with a container lid, a tea basket disposed in the tea infusing container, and a control circuit. An armature is provided at the tea basket, wherein a coil assembly is provided at the bottom side of the tea infusing container and is correspondingly aligned with the armature. The supporting frame comprises at least a vertical support upwardly extended to and slidably couple at the tea basket. At least a resilient element is coaxially coupled at the vertical support, wherein the resilient element is supported below the tea basket (the resilient element is compressed) or the resilient element is supported above the tea basket (the resilient element t is stretched out) for returning the tea basket back to its original position.

According to the present invention, the armature is provided at the surrounding wall of the tea basket, wherein the coil assembly is provided at the outer side of the surrounding wall of the tea infusing container at the bottom portion thereof.

According to the present invention, the sliding arrangement further comprises a second guiding groove vertically formed at the inner side of the surrounding wall of the tea infusing container, wherein the armature is slidably engaged with the second guiding groove, so as to ensure the tea basket being stably slid up and down.

According to the present invention, the armature is provided at the bottom side of the tea basket at a position below thereof. The coil assembly is provided at the bottom side of the tea infusing container and is correspondingly aligned with the armature.

According to the present invention, the heater unit is provided at the bottom side of the tea infusing container, wherein the heater unit can be a heating plate or heating tube.

Accordingly, the advantages of the present invention are: the present invention can accurately control the brewing time through the control circuit and can effectively separate the tea basket from the brewed tea via the resilient element, so as to separate the tea leaves from the brewed tea for adjustably controlling the concentration of the brewed tea. Comparing to the conventional tea maker, the present invention can achieve the objectives of simple structural configuration, stable and rigid structure, and low manufacturing cost.

Still further objects and advantages will become apparent from a consideration of the ensuing description and drawings.

DETAILED DESCRIPTION OF THE PREFERRED EMBODIMENT

These and other objectives, features, and advantages of the present invention will become apparent from the following detailed description, the accompanying drawings, and the appended claims.

Figure 1:
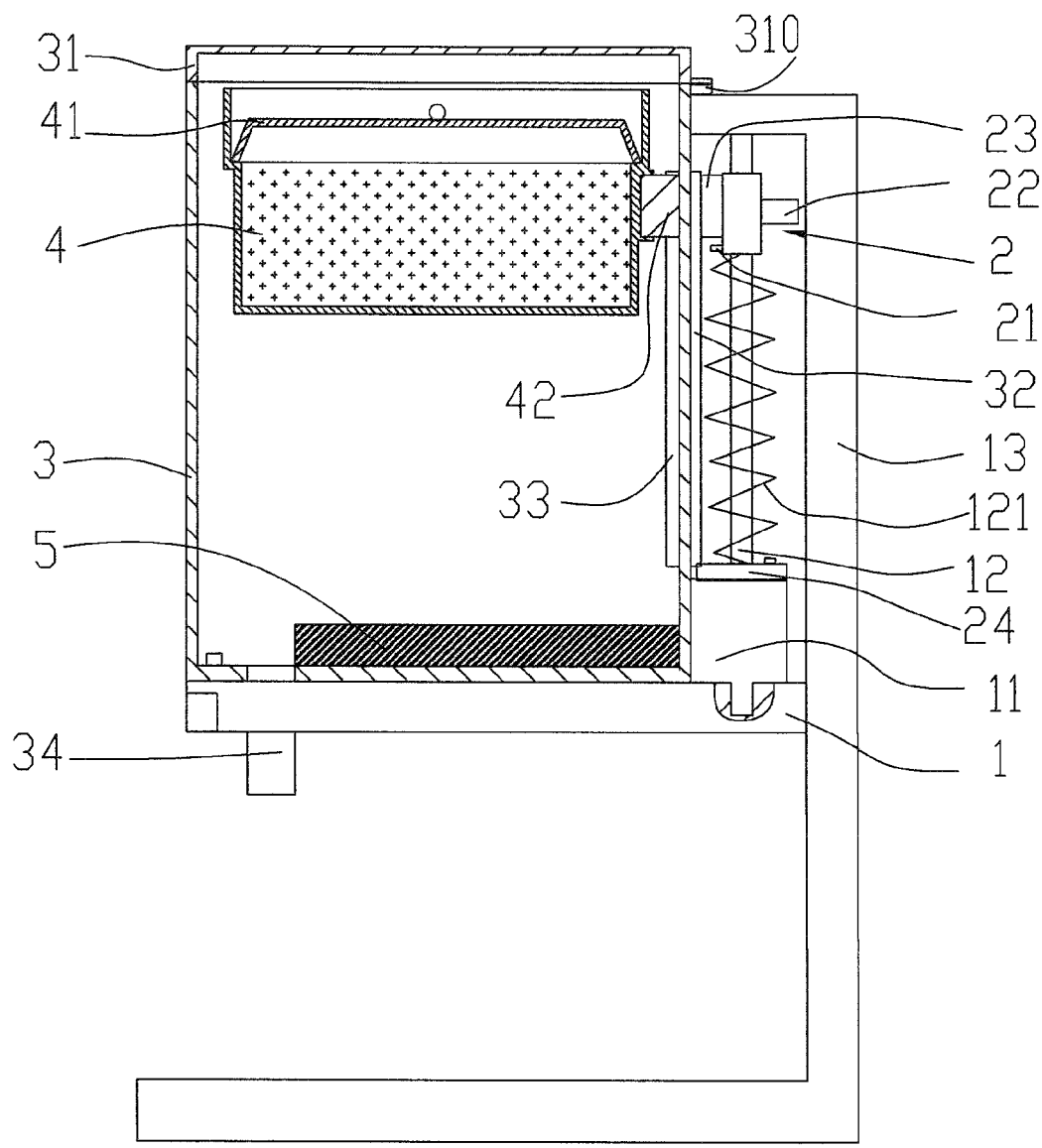
FIG. 1 is a sectional view of a tea maker according to a first preferred embodiment of the present invention.

Referring to FIG. 1 of the drawings, a tea maker according to a first embodiment of the present invention is illustrated, wherein the tea maker comprises a supporting frame 1 which is embodied as a vertical supporting post, a tea infusing container 3 with a container lid 31 supported by the supporting frame 1, a tea basket 4 with a basket lid 41 disposed in the tea infusing container 3, and a control circuit. The tea infusing container 3 is preferably integrated with the supporting frame 1. The supporting frame 1 comprises a vertical support 12 supported adjacent to an outer side of the surrounding wall of the tea infusing container 3, a handle 12, and a slider switch 24. A lid locker 310 is provided on top of the handle 13, wherein the lid locker 310 is engaged with a protrusion of the container lid 31 to selectively lock up the container lid 31 on the tea infusing container 3. The tea maker further comprises a sliding arrangement which comprises a sliding frame 2 slidably coupled at the vertical support 12, and a resilient element 121, wherein the resilient element 121, which is preferably a compression spring, is supported below the sliding frame 2. Therefore, resilient element 121 is retained at a working mode that the resilient element 121 is compressed by the sliding frame 2. (When the resilient element 121 is supported above the sliding frame 2, the resilient element 121 is retained at the working mode that the resilient element 121 is stretched out by the sliding frame 2). The sliding frame 2 is coupled at the vertical support 12 corresponding to the slider switch 24 which is coupled at the bottom end of the vertical support 12. Therefore, when the sliding frame 2 is slid downwardly along the vertical support 12, the sliding frame 2 will contact with the slider switch 24. The sliding frame 2 comprises a hanger 21, which is made of magnetic attractive material, protruded therefrom, an actuator 22 protruded toward the handle 12, and a first permanent magnet 23 coupled at the sliding frame 2. The hanger 21 is positioned corresponding to an electromagnet 11 which is located at the bottom portion of the vertical support 12, wherein the hanger 21 is supported above and aligned with the electromagnet 11. The actuator 22 is positioned offset to the handle 13 such that the handle 13 will not block the actuation of the actuator 22. The sliding arrangement further comprises a first guiding groove 32 vertically formed at the outer side of the surrounding wall of the tea infusing container 3, wherein the first permanent magnet 23 is slidably engaged at the first guiding groove 32. The sliding arrangement further comprises a second guiding groove 33 vertically formed at the inner side of the surrounding wall of the tea infusing container 3 and aligned with the first guiding groove 32. The tea basket 4 further comprises a second permanent magnet 42 provided at the outer side of the surrounding wall of the tea basket 4 and slidably engaged with the second guiding groove 33. In addition, the first and second permanent magnets 23, 42 are magnetically attracted with each other. The basket lid 41 covers a top opening of the tea basket 4. The container lid 31 covers a top opening of the tea infusing container 3. A heater unit 5 is provided at a bottom side of the tea infusing container 3, preferably provided therewithin. The tea infusing container 3 further has a tea discharging outlet 34 provided at the bottom side of the tea infusing container 3 at a position opposite to the handle 13. A temperature sensor is provided adjacent to the tea discharging outlet 34. Accordingly, the control circuit comprises a counter for counting how many times the sliding frame 2 being slid downwardly.

According to the first embodiment, the working principle and the operation is shown as follow:

(1) Fill up the water: before brewing the tea, the user is able to open up the container lid 31 and remove the tea basket 4 from the tea infusing container 3. Therefore, the user is able to fill a predetermined amount of water into the tea infusing container 3.

(2) Place the tea leaves: the user is able to place the tea leaves in the tea basket 4 by opening up the basket lid 41. Once the tea leaves are properly placed in the tea basket 4, the user is able to close the tea basket 4 by the basket lid 41 and to dispose the tea basket 4 in the tea infusing container 3.

(3) Heat up the water: Once the power is on, the user to able to press the "boil water" button on the control panel. Therefore, the heater unit 5 is automatically activated for heating up the water in the tea infusing container 3. When the temperature sensor detects the water temperature reaching a preset threshold, the control circuit will activate a buzzer for generating an audio notification.

(4) Drop down the tea basket 4: the user is able to set the brewing time on the control panel. The user is able to apply a downward force at the actuator 22 to drive the sliding frame 2 moving downward along the vertical support 12. At the same time, the first permanent magnet 23 is correspondingly driven downward along the first guiding groove 32. Due to the magnetically attraction, the second permanent magnet 42 will be slidably moved down along the second guiding groove 33 by the first permanent magnet 23 so as to drop down the tea basket 4. In other words, the movement of the tea basket 4 is driven to move by means of magnetic means. Once the tea basket 4 is dropped down at the lowest position, the hanger 11 is magnetically attracted by the electromagnet 11 so as to retain the tea basket 4 in position.

(5) Rinse the tea leave: (a) the tea basket 4 is retained in the boiling water for brewing process. (b) after a predetermined of time, such as 5 seconds, the coil of the electromagnet 11 is de-energized, such that the compressed resilient element 121 will bound to its original form to generate an upward pushing force along the vertical support 12. As a result, the first permanent magnet 23 is correspondingly driven upward along the first guiding groove 32 by the resilient element 121. Due to the magnetically attraction, the second permanent magnet 42 will be slidably moved up along the second guiding groove 33 by the first permanent magnet 23 so as to lift up the tea basket 4. It is worth mentioning that the tea basket 4 is lifted up at a position above the water level of the boiling water in the tea infusing container 3. (c) The water in the tea infusing container 3 is drained via the tea discharging outlet 34. It is worth mentioning that the user is able to actuate a "discharge" switch on the control panel to drain the water out of the tea infusing container 3, wherein the water is used for rinsing the tea leaves as the tea rinsing water.

(6) Fill up the water again: the user is able to open up the container lid 31 and remove the tea basket 4 from the tea infusing container 3. Therefore, the user is able to fill a predetermined amount of water into the tea infusing container 3. Once the tea basket 4 is disposed in the tea infusing container 3, the user is able to cover the top opening of the tea basket 4 by the basket lid 41.

(7) Boil the water: the user is able to select which type of tea leave to brew the tea by selectively pressing a corresponding "tea type" button on the control panel. Once the "tea type" button is pressed, the brewing time and temperature will be automatically set to brew the tea. The heater unit 5 is also automatically activated for heating up the water in the tea infusing container 3.

(8) Drop down the tea basket 4: when the water temperature reaches the preset threshold, the control circuit will activate the buzzer for generating an audio notification. The user is able to apply the downward force at the actuator 22 to drive the sliding frame 2 moving downward along the vertical support 12. At the same time, the first permanent magnet 23 is correspondingly driven downward along the first guiding groove 32. Due to the magnetically attraction, the second permanent magnet 42 will be slidably moved down along the second guiding groove 33 by the first permanent magnet 23 so as to drop down the tea basket 4. In other words, the movement of the tea basket 4 is driven to move by means of magnetic means. Once the tea basket 4 is dropped down at the lowest position, the hanger 11 is magnetically attracted by the electromagnet 11 so as to retain the tea basket 4 in position.

(9) Drew the tea: the tea basket 4 is retained in the boiling water and the brewing time is started to brew the tea.

(10) Lift up the tea basket 4: when the brewing time is finished, the coil of the electromagnet 11 is automatically de-energized, such that the compressed resilient element 121 will bound to its original form to generate the upward pushing force along the vertical support 12. As a result, the first permanent magnet 23 is correspondingly driven upward along the first guiding groove 32 by the resilient element 121. Due to the magnetically attraction, the second permanent magnet 42 will be slidably moved up along the second guiding groove 33 by the first permanent magnet 23 so as to lift up the tea basket 4. It is worth mentioning that the tea basket 4 is lifted up at a position above the water level of the boiling water in the tea infusing container 3.

(11) Discharge the brewed tea: when the user wants a cup of tea, the user is able to actuate the "discharge" switch on the control panel to discharge the brewed water out of the tea infusing container 3 via the tea discharging outlet 34.

(12) Heat preservation: when the temperature sensor detects the water temperature below a preset threshold, the heater unit 5 is automatically activated for heating up the water in the tea infusing container 3 so as to retain the brewed tea therein at a predetermined temperature.

When replacing the tea leaves, the lid switch 310 is actuated once corresponding to the container lid 31. The control circuit will initialize the counter as zero corresponding to the counting number of the sliding frame 2 being slid downwardly. Every time when the sliding frame is slid downwardly, the slider switch 24 will be contacted once to add the counting number of the sliding frame 2 being slid downwardly.

According to the first embodiment, the hanger 21 can be replaced by an armature 112 and the electromagnet 11 can be replaced by induction coil assembly 111.

Figure 2:
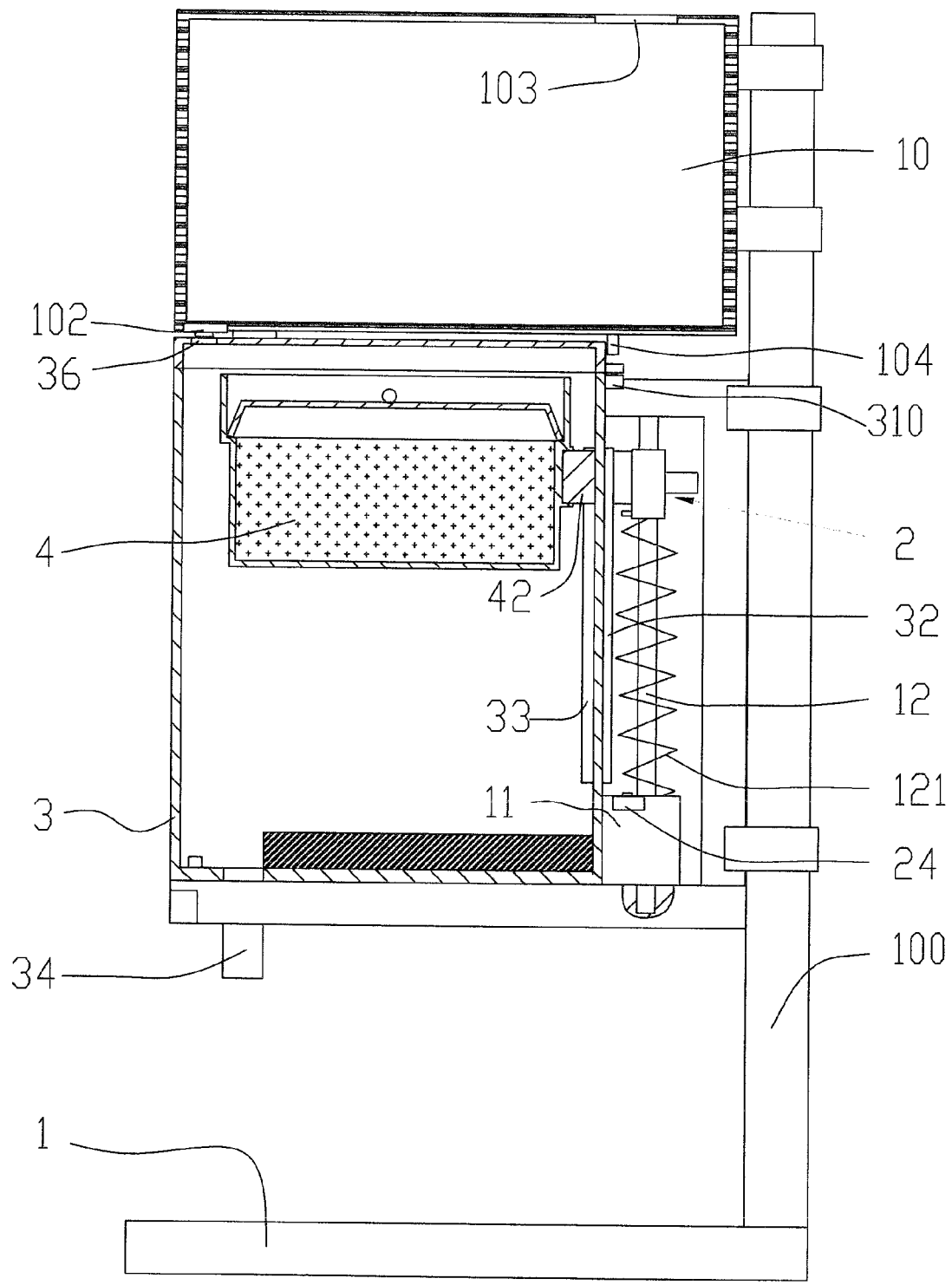
FIG. 2 is a sectional view of a tea maker according to a second preferred embodiment of the present invention.

As shown in FIG. 2, a tea maker according to a second embodiment illustrates an alternative mode of the first embodiment, wherein the tea maker further comprises a water tank 10 supported above the tea infusing container 3. The supporting frame 1 further comprises a supporting shaft 100. The water tank 10 is rotatably coupled at the supporting shaft 100, wherein the water tank 10 and the tea infusing container 3 can be rotatably moved at the supporting shaft 100. The tea infusing container 3 further comprises a first water inlet 36 which is provided at the top side thereof and is aligned with a water outlet of the water tank 10. In particular, an electromagnetic water valve 102 is provided at the water outlet of the water tank 10, wherein the water outlet of the water tank 10 is provided at the bottom side thereof. The water tank 10 further comprises a second water inlet 103 provided at the top side of the water tank 10. An alignment unit 104 is provided between the water tank 10 and the tea infusing container 3 to ensure the correct alignment between the first water inlet 36 of the tea infusing container 3 and the electromagnetic water valve 102 at the water inlet of the water tank 10 when the water tank 10 and the tea infusing container 3 are rotated about the supporting shaft 100.

According to the second embodiment, the working principle and the operation is similar to that of the first embodiment, wherein the following shows the differences between the first and second embodiments:

(1) Fill up the water: (a) the user is able to directly fill up the water in the tea infusing container 3 by rotatably moving either the tea infusing container 3 or the water tank 10 to fill the water into the tea infusing container 3 via the first water inlet 36. Alternatively, the user is able to open up the container lid 31 to fill a predetermined amount of water into the tea infusing container 3. After filling up the water, the tea infusing container 3 or the water tank 10 can be rotated back to its original position to align the first water inlet 36 of the tea infusing container 3 with the electromagnetic water valve 102 at the water inlet of the water tank 10. (b) the user is also able to fill up the water in the tea infusing container 3 from the water tank 10. The user is able to fill the water in the water tank 10 via the second water inlet 103 thereof. After filling the water in the water tank 10, the water can be guided to fill into the tea infusing container 3 from the water tank 10 via the first water inlet 36 of the tea infusing container 3. In particular, the user is able to press a button on the control panel to activate the electromagnetic water valve 102 through the control circuit so as to open the electromagnetic water valve 102 for allowing the water in the water tank 10 filling into the tea infusing container 3.

(6) Fill up the water again: the user is able to fill the water into the tea infusing container 3 by any one of the filling methods in the above step (1).

According to the second embodiment, the tea maker of the present invention provides the water tank 10 to enhance the practice use of the tea maker for easily filling up water into the tea infusing container 3.

Figure 3:
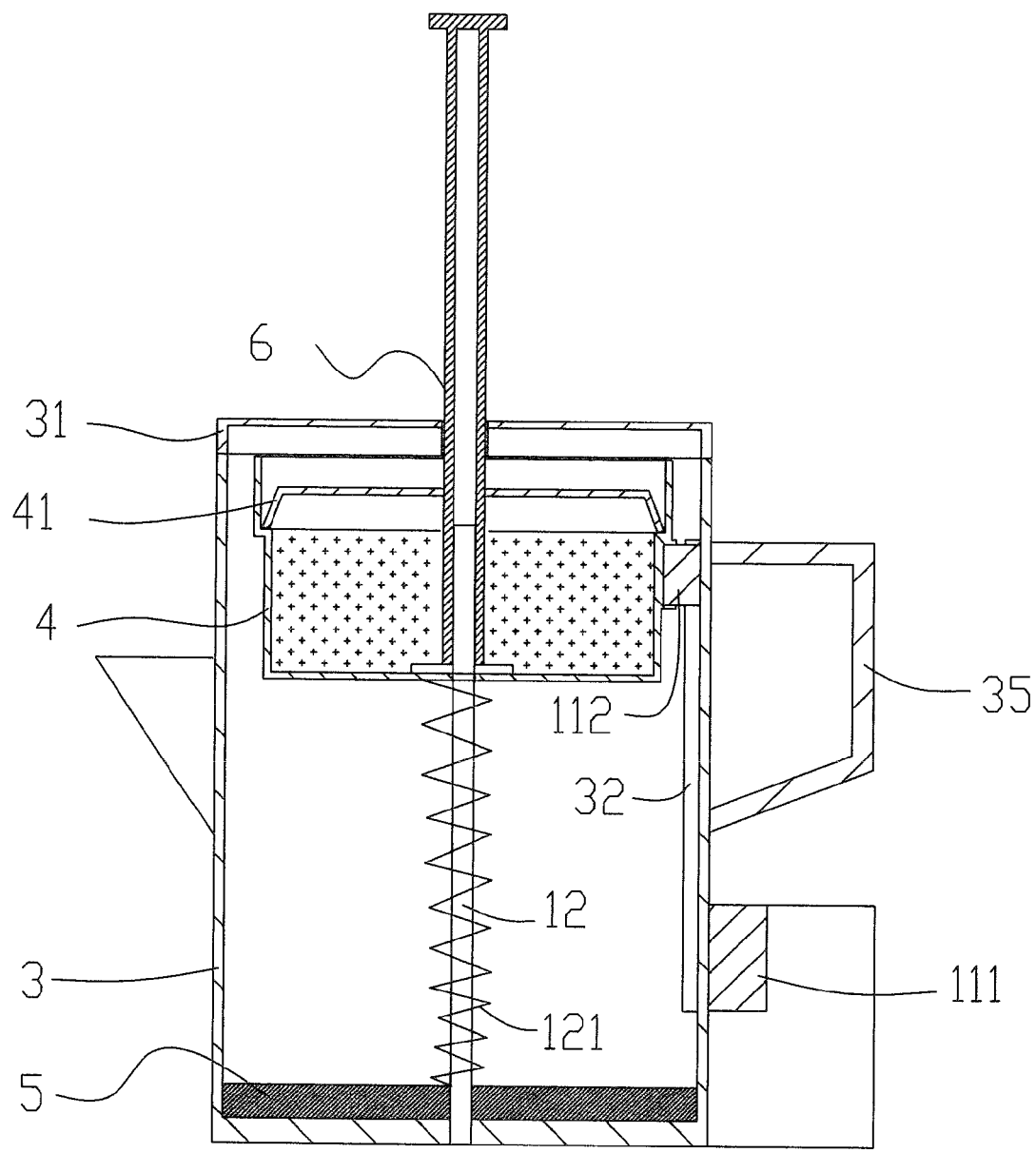
FIG. 3 is a sectional view of a tea maker according to a third preferred embodiment of the present invention.

As shown in FIG. 3, a tea maker according to a third embodiment illustrates another alternative mode of the first embodiment, wherein the tea maker comprises a tea infusing container 3 with a container lid 31, a control circuit, and a tea basket 4 with a basket lid 41 disposed in the tea infusing container 3. A handle 35 is provided at the tea infusing container 3, wherein the control circuit and the coil assembly 111 are provided at the bottom of the handle 35. The armature 112 is provided at the outer side of the surrounding wall of the tea basket 4 and is correspondingly aligned with the coil assembly 111. The first guiding groove 32 is provided at the inner side of the surrounding wall of the tea infusing container 3, wherein the armature 112 is slidably engaged with the first guiding groove 32. A through slot of the container lid 31 is coaxially aligned with a through slot of the basket lid 41 to form a sliding channel, wherein a presser 6 is slidably extended through the through slots of the container lid 31 and the basket lid 41 along the sliding channel. Accordingly, the presser 6, which is a tubular member, has a bottom portion of the presser 6 is extended into the tea infusing container 3 to press the tea basket 6 toward the bottom side of the tea infusing container 3. The vertical support 12 is extended from the bottom side of the tea infusing container 3 into the tea basket 4 and is coaxially and slidably inserted into the presser 6 through the tea basket 4, so as to guide the presser 6 being slid at the vertical support 12. The resilient element 121 is coaxially coupled at the vertical support 12, wherein the upper end of the resilient element 121 is biased against the bottom of the tea basket 4 and the bottom end of the resilient element 121 is biased against the bottom side of the tea infusing container 3. The heater unit 5 and temperature sensor are provided at the bottom side of the tea infusing container 3.

According to the third embodiment, the working principle and the operation is shown as follow:

(1) Fill up the water: before brewing the tea, the user is able to open up the container lid 31 and remove the tea basket 4 from the tea infusing container 3 by lifting up the presser 6. Therefore, the user is able to fill a predetermined amount of water into the tea infusing container 3.

(2) Place the tea leaves: the user is able to place the tea leaves in the tea basket 4 by opening up the basket lid 41. Once the tea leaves are properly placed in the tea basket 4, the user is able to close the tea basket 4 by the basket lid 41 and to dispose the tea basket 4 in the tea infusing container 3. Then, the user is able to close the tea infusing container 3 by the container lid 31.

(3) Heat up the water: Once the power is on, the user to able to press the "boil water" button on the control panel. Therefore, the heater unit 5 is automatically activated for heating up the water in the tea infusing container 3.

(4) Drop down the tea basket 4: When the temperature sensor detects the water temperature reaching a preset threshold or when the water heating time reaches the preset time, the control circuit will activate the buzzer for generating an audio notification. The user is able to apply a downward force at the presser 6 to drive the tea basket 4 moving downwardly along the vertical support 12. At the same time, the armature 112 is correspondingly driven downward along the first guiding groove 32. Once the tea basket 4 is dropped down at the preset position, the armature 112 is magnetically attracted to the coil assembly 111 so as to retain the tea basket 4 in position.

(5) Rinse the tea leave: (a) the tea basket 4 is retained in the boiling water for brewing process. (b) after a predetermined of time, such as 5 seconds, the coil of the coil assembly 111 is de-energized to magnetically disengage with the armature 112, such that the compressed resilient element 121 will bound to its original form to generate an upward pushing force along the vertical support 12. As a result, the armature 112 is correspondingly driven upward along the first guiding groove 32 by the resilient element 121. (c) The user is able to drain out the water in the tea infusing container 3 as the tea rinsing water.

(6) Fill up the water again: the user is able to open up the container lid 31. Therefore, the user is able to fill a predetermined amount of water into the tea infusing container 3.

(7) Boil the water: the user is able to select which type of tea leave to brew the tea by selectively pressing a corresponding "tea type" button on the control panel. Once the "tea type" button is pressed, the brewing time and temperature will be automatically set to brew the tea. Then, the user is able to press the "brew" button, such that the heater unit 5 is also automatically activated by the control circuit for heating up the water in the tea infusing container 3.

(8) Drop down the tea basket 4: when the water temperature reaches the preset threshold or when the water heating time reaches the preset time, the control circuit will activate the buzzer for generating an audio notification. The user is able to apply the downward force at the presser 6 to drive the tea basket 4 moving downward along the vertical support 12. At the same time, the armature 112 is correspondingly driven downward along the first guiding groove 32. Once the tea basket 4 is dropped down at the preset position, the armature 112 is magnetically attracted to the electrified coil assembly 111 so as to retain the tea basket 4 in position.

(9) Drew the tea: the tea basket 4 is retained in the boiling water and the brewing time is started to brew the tea.

(10) Lift up the tea basket 4: when the brewing time is finished, the coil of the coil assembly 111 is automatically de-energized to magnetically disengage with the armature 112, such that the compressed resilient element 121 will bound to its original form to generate the upward pushing force along the vertical support 12. As a result, the armature 112 is correspondingly driven upward along the first guiding groove 32 by the resilient element 121.

(11) Discharge the brewed tea: when the user wants a cup of tea, the user is able to discharge the brewed water out of the tea infusing container 3.

(12) Heat preservation: when the temperature sensor detects the water temperature below a preset threshold, the heater unit 5 is automatically activated for heating up the water in the tea infusing container 3 so as to retain the brewed tea therein at a predetermined temperature.

According to the third embodiment, the vertical movement of the tea basket 4 is controlled by the presser 6 that the tea basket 4 can be moved up and down along the vertical support 12. In addition, the brewing time for the tea basket 4 within the tea infusing container 3 is adjustably controlled that when the brewing time is up, the tea basket 4 is automatically lifted above the water level in the tea infusing container 3 so as to adjustably control the concentration of the brewed tea. Through the heat preservation process, the brewed tea in the tea infusing container 3 will be kept at a predetermined temperature to ensure the hot brewed tea being served for the user.

Figure 4:
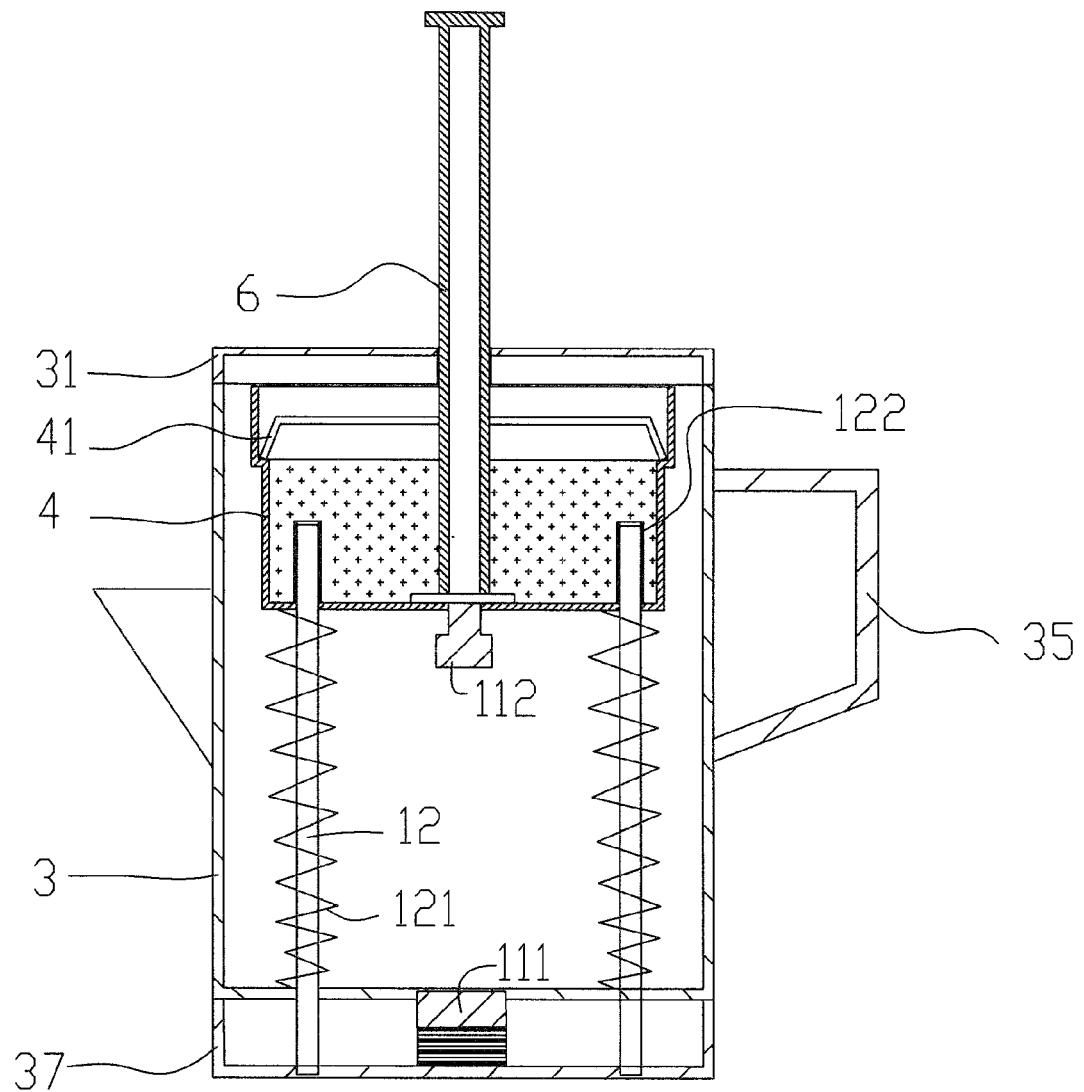
FIG. 4 is a sectional view of a tea maker according to a fourth preferred embodiment of the present invention.

As shown in FIG. 4, a tea maker according to a fourth embodiment illustrates an alternative mode of the third embodiment, wherein the tea maker comprises a tea infusing container 3 with a container lid 31, a control circuit, and a tea basket 4 with a basket lid 41 disposed in the tea infusing container 3. A handle 35 is provided at the tea infusing container 3, wherein the armature 112 is provided at the bottom side of the tea basket 4, i.e. underneath the tea basket 4. The coil assembly 111 is provided at the bottom side of the tea infusing container 3 and is correspondingly aligned with the armature 112. A through slot of the container lid 31 is coaxially aligned with a through slot of the basket lid 41 to form a sliding channel, wherein a presser 6 is slidably extended through the through slots of the container lid 31 and the basket lid 41 along the sliding channel. Accordingly, the presser 6, which is a tubular member, has a bottom portion of the presser 6 is extended into the tea infusing container 3 and is pressed against the bottom side of the tea basket 4. Two vertical supports 12 are spacedly extended from the bottom side of the tea infusing container 3 to slidably extend through the bottom side of with the tea basket 4. In particular, the tea basket 4 has two tubular sleeves 122 extended from the bottom side of the tea basket 4, wherein the vertical supports 12 are slidably extended through the tubular sleeves 122 respectively to enable the tea basket 4 being slid up and down along the vertical supports 12. Two resilient elements 122 are coaxially coupled at the vertical supports 12 respectively, wherein the upper end of each resilient element 121 is biased against the bottom of the tea basket 4 and the bottom end of each resilient element 121 is biased against the bottom side of the tea infusing container 3. The heater unit 5 and temperature sensor are provided at the bottom side of the tea infusing container 3.

According to the fourth embodiment, the working principle and the operation is shown as follow:

(1) Fill up the water: before brewing the tea, the user is able to open up the container lid 31 and remove the tea basket 4 from the tea infusing container 3 by lifting up the presser 6. Therefore, the user is able to fill a predetermined amount of water into the tea infusing container 3.

(2) Place the tea leaves: the user is able to place the tea leaves in the tea basket 4 by opening up the basket lid 41. Once the tea leaves are properly placed in the tea basket 4, the user is able to close the tea basket 4 by the basket lid 41 and to dispose the tea basket 4 in the tea infusing container 3. Then, the user is able to close the tea infusing container 3 by the container lid 31.

(3) Heat up the water: Once the power is on, the user to able to select the setting of heating time or heating temperature on the control panel. Therefore, the heater unit 5 is automatically activated for heating up the water in the tea infusing container 3.

(4) Drop down the tea basket 4: When the temperature sensor detects the water temperature reaching a preset threshold or when the water heating time reaches the preset time, the control circuit will activate the buzzer for generating an audio notification. The user is able to apply a downward force at the presser 6 to drive the tea basket 4 moving downwardly along the vertical support 12. At the same time, the armature 112 is correspondingly driven downward along the first guiding groove 32. Once the tea basket 4 is dropped down at the preset position, the armature 112 is magnetically attracted to the coil assembly 111 so as to retain the tea basket 4 in position.

(5) Rinse the tea leave: (a) the tea basket 4 is retained in the boiling water for brewing process. (b) after a predetermined of brewing time, the coil of the coil assembly 111 is de-energized to magnetically disengage with the armature 112, such that the compressed resilient elements 121 will bound to the original form to generate an upward pushing force along the vertical support 12. (c) The user is able to drain out the water in the tea infusing container 3 as the tea rinsing water.

(6) Fill up the water again: the user is able to open up the container lid 31. Therefore, the user is able to fill a predetermined amount of water into the tea infusing container 3.

(7) Boil the water: the user is able to select which type of tea leave to brew the tea by selectively pressing a corresponding "tea type" button on the control panel. Once the "tea type" button is pressed, the brewing time and temperature will be automatically set to brew the tea. Then, the user is able to press the "brew" button, such that the heater unit 5 is also automatically activated by the control circuit for heating up the water in the tea infusing container 3.

(8) Drop down the tea basket 4: when the water temperature reaches the preset threshold or when the water heating time reaches the preset time, the control circuit will activate the buzzer for generating an audio notification. The user is able to apply the downward force at the presser 6 to drive the tea basket 4 moving downward along the vertical supports 12. Once the tea basket 4 is dropped down at the preset position, the armature 112 is magnetically attracted to the electrified coil assembly 111 so as to retain the tea basket 4 in position.

(9) Drew the tea: the tea basket 4 is retained in the boiling water and the brewing time is started to brew the tea.

(10) Lift up the tea basket 4: when the brewing time is finished, the coil of the coil assembly 111 is automatically de-energized to magnetically disengage with the armature 112, such that the compressed resilient elements 121 will bound to the original form to generate the upward pushing force along the vertical supports 12. As a result, the armature 112 is correspondingly driven upward by the resilient element 121.

(11) Discharge the brewed tea: when the user wants a cup of tea, the user is able to discharge the brewed water out of the tea infusing container 3.

(12) Heat preservation: when the temperature sensor detects the water temperature below a preset threshold, the heater unit 5 is automatically activated for heating up the water in the tea infusing container 3 so as to retain the brewed tea therein at a predetermined temperature.

According to the fourth embodiment, the vertical movement of the tea basket 4 is controlled by the presser 6 that the tea basket 4 can be moved up and down along the vertical support 12. In addition, the brewing time for the tea basket 4 within the tea infusing container 3 is adjustably controlled that when the brewing time is up, the tea basket 4 is automatically lifted above the water level in the tea infusing container 3 so as to adjustably control the concentration of the brewed tea. Through the heat preservation process, the brewed tea in the tea infusing container 3 will be kept at a predetermined temperature to ensure the hot brewed tea being served for the user.

According to the present invention, the heater unit 5 can be a heating plate or heating tube.

According to the present invention, the tea infusing container 3 can configured to have a circular shape or rectangular shape. Or, the tea infusing container 3 can configured to have a flat sidewall integrated with a curved sidewall to form an irregular surrounding wall of the tea infusing container 3.

According to the present invention, when less amount of water is used for brewing tea, i.e. below the top of the tea basket 4, the basket lid 41 can be omitted to cover at the tea basket 4.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A tea maker, comprising a supporting frame, a tea infusing container with a container lid supported by said supporting frame, a tea basket disposed in said tea infusing container, and a sliding arrangement which comprises at least a vertical support, a sliding frame slidably coupled at said vertical support, a resilient element coaxially coupled at said vertical support, a hanger protruded from said sliding frame, an actuator coupled at said sliding frame, a first permanent magnet coupled at said sliding frame, a second permanent magnet provided at an outer side of a surrounding wall of said tea basket and magnetically attracted with said first permanent magnet, and an electromagnet supported below and aligned with said hanger.

2. The tea maker, as recited in claim 1, wherein said sliding arrangement further comprises a second guiding groove vertically formed at an inner side of a surrounding wall of said tea infusing container, wherein said second permanent magnet is slidably engaged with said second guiding groove.

3. The tea maker, as recited in claim 2, wherein said sliding arrangement further comprises a first guiding groove vertically formed at an outer side of said surrounding wall of said tea infusing container, wherein said first permanent magnet is slidably engaged at said first guiding groove.

4. The tea maker, as recited in claim 3, wherein said surrounding wall of said tea infusing container is configured one of a circular shape, rectangular shape, and a flat sidewall integrated with a curved sidewall to form an irregular surrounding wall of said tea infusing container.

5. The tea maker, as recited in claim 4, further comprising a heater unit provided at a bottom side of said infusing container.

6. The tea maker, as recited in claim 5, further comprising a water tank supported above said tea infusing tea and a supporting shaft extended from said supporting frame, wherein said water tank comprises an electromagnetic water valve provided at a water outlet of said water tank and aligned with a first water inlet of said tea infusing container, wherein said water tank and said tea infusing container are rotatably coupled at said supporting shaft.

* * * * *